Patented Sept. 16, 1924.

1,509,062

UNITED STATES PATENT OFFICE.

ROY H. HOOVER, OF FREEPORT, ILLINOIS, ASSIGNOR TO R. H. HOOVER LABORATORIES, INC., OF FREEPORT, ILLINOIS, A CORPORATION OF ILLINOIS.

FERTILIZING COMPOSITION.

No Drawing.     Application filed December 29, 1919. Serial No. 348,041.

*To all whom it may concern:*

Be it known that I, ROY H. HOOVER, a citizen of the United States, residing at Freeport, in the county of Stephenson and State of Illinois, have invented a certain new and useful Improvement in Fertilizing Compositions, of which the following is a full, clear, concise, and exact description.

The present invention relates to fertilizers, and particularly to a new and improved composition of vegetable and other matter, the constituents of which preclude any possibility of generation of unpleasant odors, so that the composition may be employed within buildings, homes and the like, in small flower pots and flower beds without being offensive to smell.

My invention as described later embodies a number of constituent elements, which, when combined in certain proportions, have been found to produce an economic and effective fertilizer, devoid of any unpleasant odors. It is to be understood that I distinguish my invention from fertilizing compounds in which an odor does exist; the composition of my invention embodying such constituents as will eliminate primarily the generation of any unpleasant odor, rather than permitting generation of the odor which forbids use of the fertilizer indoors. I do not use a deodorizing element, as one of its principal disadvantages resides in the fact that such an element is usually subject to evaporization, and when the deodorizing element evaporates the fertilizer will give off a bad odor. In the preferred embodiment of my invention I combine pine oil, oil of wintergreen (synthetic) and oil of star anise with tankage in certain proportions, which cooperate to produce a non-odorant effective fertilizer.

While I shall prescribe certain proportions of the constituents of my improved composition, I do not limit myself to the proportions prescribed.

It is preferred that the pine oil be steam distilled and the wintergreen synthetic as it has been found that these elements give the best results under the conditions when the same are combined. As it is well known, tankage usually consists of animal bone, meat and blood, and is an excellent fertilizer. The association with tankage of the other constituents referred to above both enhance the fertilizing properties of the composition and form a fertilizing composition entirely devoid of unpleasant odors.

The preferable relative proportions in which the hereinbefore mentioned ingredients are mixed are as follows:

Pine oil (steam distilled) seventeen pounds,

Oil of wintergreen (synthetic) five pounds,

Oil of star anise, five pounds.

The above ingredients are thoroughly mixed and then are mixed with the tankage in the proportions of one pound of oil mixture to one hundred pounds of tankage. Of course, I do not limit myself to the exact proportion of tankage to oil, as under some conditions it may be found necessary to vary, slightly, these proportions.

I do not limit myself to any particular method of combining the oil and tankage as specified. If desired, the three oils may first be combined thoroughly and then the resultant mixture combined with the tankage, or all four ingredients may be mixed at the same time. The mixing process may be accomplished by mechanical means or by hand. By combining the constituents of my invention in the proportions prescribed or in proportions relatively close thereto, a perfect fertilizer is to be had which I have found in actual tests to be entirely free of offensive odors.

From the foregoing it will be seen that instead of providing a composition possessing an unpleasant odor and then deodorizing the same, I combine suitable constituents to form a fertilizer which is entirely free from any unpleasant odor.

I do not limit myself to the exact details specified.

I claim:

1. A composition consisting of pine oil, oil of wintergreen, oil of star anise and tankage, the oils being combined with the tankage in proportion of one pound of oil to one-hundred pounds of tankage.

2. A composition of matter for the purpose specified, consisting of pine oil, oil of wintergreen, oil of star anise and tankage, said oils being combined in the proportion of seventeen pounds of pine oil, five pounds of oil of wintergreen and five pounds of star anise, the oils being combined with the tankage in the proportion of one pound of oil to one-hundred pounds of tankage.

3. A fertilizer composition consisting of one pound of an odor counteracting mixture including pine oil, oil of wintergreen and oil of star anise combined with one hundred pounds of tankage.

4. A composition for fertilizing purposes consisting of steam distilled pine oil, synthetic oil of wintergreen, oil of star anise and tankage.

In witness whereof I hereunto subscribe my name this 24th day of December, 1919.

ROY H. HOOVER.